(12) United States Patent
Ikonen (10) Patent No.: US 10,466,333 B2
(45) Date of Patent: Nov. 5, 2019

(54) APPARATUS, SYSTEM AND METHOD FOR FINDING DIRECTION

(71) Applicant: Sharpeye Systems Oy, Helsinki (FI)

(72) Inventor: Pasi Ikonen, Helsinki (FI)

(73) Assignee: SHARPEYE SYSTEMSOY, Helsinki (FI)

( * ) Notice: Subject to any disclaimer, the term of this patent is extended or adjusted under 35 U.S.C. 154(b) by 312 days.

(21) Appl. No.: 15/626,322

(22) Filed: Jun. 19, 2017

(65) Prior Publication Data

US 2017/0363706 A1 Dec. 21, 2017

(30) Foreign Application Priority Data

Jun. 21, 2016 (FI) ...................................... 20165513

(51) Int. Cl.
*G01S 3/40* (2006.01)
*G01S 3/28* (2006.01)

(52) U.S. Cl.
CPC . *G01S 3/40* (2013.01); *G01S 3/28* (2013.01)

(58) Field of Classification Search
CPC ..... G01S 3/40; G01S 3/28; G01S 1/02; G01S 1/24; G01S 1/245; G01S 1/68; G01S 1/042
USPC ........................................................ 342/385
See application file for complete search history.

(56) References Cited

U.S. PATENT DOCUMENTS

| 2004/0113791 | A1* | 6/2004 | Salim | G06K 17/0022 340/572.3 |
| 2007/0202811 | A1* | 8/2007 | Chanowitz | H04B 5/0062 455/67.12 |
| 2008/0004642 | A1 | 1/2008 | Birk et al. | |
| 2008/0012765 | A1 | 1/2008 | Xu et al. | |
| 2010/0188211 | A1 | 7/2010 | Brommer et al. | |
| 2010/0283584 | A1* | 11/2010 | McAllister | B65C 9/1865 340/10.1 |

OTHER PUBLICATIONS

Sun, Xiaobing, et al., "A High Accuracy Mono-Station UWB Positioning System", IEEE International Conference on Ultra-Wideband (ICUWB 2008), vol. 01, Sep. 10-12, 2008, pp. 201-204.
Search Report received for Finnish Patent Application No. 20165513, dated Jan. 16, 2017, 2 pages.

* cited by examiner

*Primary Examiner* — Harry K Liu
(74) *Attorney, Agent, or Firm* — Ziegler IP Law Group, LLC (57) ABSTRACT

An apparatus, a system and a method for finding a direction of a radio tag having a transmitter and at least one antenna for sending signals to the apparatus. The apparatus including a receiver; at least one antenna capable to form at least two directivity fields; and means for determining the direction of the apparatus by a first path signal received from the radio tag by the at least two directivity fields of the at least one antenna of the apparatus. The direction is found by turning the apparatus to a direction of the most intense directivity field of the first path signal until the field intensities of the two directivity fields are equal.

18 Claims, 9 Drawing Sheets

Fig. 9 Apparatus System RX 140

Fig. 10 Tag System TX 150

Fig. 11 Apparatus System TRX 160

Fig. 12 Tag System TRX 170

Fig. 17    The Algorithm Flow Chart

APPARATUS, SYSTEM AND METHOD FOR FINDING DIRECTION

CROSS REFERENCE TO RELATED APPLICATIONS

This application claims the benefit of and priority to Finnish patent application No. 20165513, filed Jun. 21, 2016, the disclosure of which is incorporated herein by reference in its entirety.

TECHNICAL FIELD

The present disclosure relates generally to navigation technologies, and more specifically to an apparatus, a system and a method for finding an arrival direction of a radio signal.

BACKGROUND

Nowadays object tracking or navigation tasks are implemented by pre-installed infrastructure like GNSS-satellites, base stations or proximity beacons or by pre-mapped environment, like radio or magnetic finger printing. However, such methods may not be efficient for indoor navigation or when sub-meter accuracy is needed.

Some applications like an auto follow camera or robotics are using image pattern recognition. There challenges are in high processing power, complex software and changing light environment and lack of capability to differentiate similar objects. Further, radio based point to point angle of arrival methods has been used over decades, like Watson-Watt method. The challenge of such methods has been in reflections and propagation distortions of radio signal. The best known implementations give good accuracy, but are still quite big, expensive and suffer from signal reflections.

Therefore, in light of the foregoing discussion, there exists a need to overcome the aforementioned drawbacks associated with tracking or navigation, particularly finding arrival direction of radio signals.

SUMMARY

The present disclosure provides an improved direction finding apparatus, system and method for Ultra Wideband (UWB) signal to be transmitted by a radio tag. The disclosure includes creation of an accurate sweet spot angle, an adaptive power transmission for longer range application and an optimal set of antenna for the same.

In one aspect, an embodiment of the present disclosure provides an apparatus for finding a direction of a radio tag having a transmitter and at least one antenna for sending signals to the apparatus, the apparatus comprises:
  a receiver;
  at least one antenna capable to form at least two directivity fields; and
  means for determining the direction of the apparatus by a first path signal received from the radio tag by the at least two directivity fields of the at least one antenna of the apparatus;
  wherein the direction is found by turning the apparatus to a direction of the most intense directivity field of the first path signal until the field intensities of the two directivity fields are equal.

In another aspect, an embodiment of the present disclosure provides a system for finding a direction, the system comprises:
  an apparatus comprising
    a receiver, and
    at least one antenna capable to form at least two directivity fields; and
  a radio tag comprising
    a transmitter, and
    at least one antenna for sending signals to the apparatus;
  wherein the apparatus includes means for determining the direction of the radio tag by a first path signal received from the radio tag by the at least two directivity fields of the at least one antenna of the apparatus, and
  wherein the direction is found by turning the apparatus to a direction of the most intense directivity field of the first path signal until the field intensities of the two directivity fields are equal.

In yet another aspect, an embodiment of the present disclosure provides a method for determining a direction of a radio tag in relation to an apparatus, the method comprises steps of:
  receiving a signal from the radio tag by the apparatus;
  determining an intensity of the received signal by at least two directivity fields formed by at least one antenna of the apparatus;
  determining a rough direction by a most intense directivity field; and turning the apparatus to a direction of the most intense directivity field until field intensities of the two directivity fields are equal.

In another aspect, an embodiment of the present disclosure provides a software product comprising a non-transitory computer-readable storage medium having computer-readable instructions stored thereon, the software product being executable by a computerized device comprising processing hardware to implement the aforesaid method.

BRIEF DESCRIPTION OF THE DRAWINGS

FIG. 8. illustrates the sweet spot of four fields from front view. Both left/right (105, 106) and up/down (107, 108)

pairs create equality planes (seen as a line in a front projection) and the sweet spot crossing line (seen as a point in a front projection) of those (115);

DETAILED DESCRIPTION

The following description is presented to allow a skilled person to implement the present disclosure.

Definitions

Signal—The radio signal characterized by frequency, bandwidth, time length (can be continuous or a pulse(s)) and strength, in some advantageous embodiments of the invention the signal is a UWB (Ultra Wideband) signal.

Ultra Wideband—UWB is a radio technology where the signal bandwidth exceeds the lesser of 500 MHz or 20% of fractional bandwidth.

Signal strength—Defined by energy, power or amplitude of the signal.

First path signal—Is a radio signal or a pulse recognized arriving first, before potential other reflections arriving later.

Directivity field—Is directional power sensitivity characteristics of radio antenna.

Essentially equal field strength means in this application for example a difference less than 2 dB yields a resolution of 2 degrees of solid angle. On the other hand this definition is dependent on noise characteristics of system and accuracy needs (as angle degree) of specific application.

Acronyms List

PtP Point to Point
UWB Ultra Wideband
IR Impulse Radio
RSSI Received Signal Strength Indication
AoA Angle of Arrival
AR Augmented Reality
RF Radio Frequency
GNSS Global Navigation Satellite System
IC Integrated Circuit
ToF Time of Flight
LoS Line of Sight
nLoS Non Line of Sight Overview This aspects of the disclosed embodiments allow people or an electrical equipment to find a wanted direction of a wanted object carrying a radio tag. This is an independent point to point navigation method differentiating from methods using external infrastructure, like satellites, base stations or beacons or pre-mapped environment, like radio or magnetic finger printing or conventional mapping and co-ordinates or 3D-scanning.

Direction detection requires antenna/antennas that are directional. Antennas having a pronounced directivity are more sensitive in certain a direction than in others. The sensing pattern of such an antenna forms a directional lobe in the sensing direction that it is most sensitive to. For the purposes of the disclosure, such a field is referred to as a directivity field.

This method and system includes one apparatus with direction detection capability and one or more radio tags. The apparatus can be constructed in several mechanical forms, as a device which is capable to turn itself or instruct the user to turn it or to construct apparatus with electrically adjustable radio receiver directivity fields. The radio tag in the simplest implementation is a transmitter sending a regular signal, but can be modified to meet requirements of user environment.

The uniqueness of this system, compared with existing navigation methods, is the independence from external infrastructure or pre-mapping, wide use range 0-300 m even indoors as well as the accuracy with high noise tolerance when compared to other radio based point to point direction finding methods. Indeed there is a surprising technical effect which is described in the following. When compared with other existing point to point navigation methods, the accuracy of direction measurement of the present disclosure is better so that the direction of the arriving signal can be determined within +−2 degrees to all solid angle directions. The high accuracy is based on an accurate sweet spot element which relies on physically turning the antenna system to find the direction of the target. The accuracy of the sweet spot element is based on new combination of aspects including measuring only the clean and accurate first path signal, and creating sharp and symmetric antenna field shapes with same polarity directions. Traditional methods that not relying on the first path signal suffer from multi path propagation of the signal. There are also some other methods which measure the first path signal, but which aren't accurate to all solid angle directions due to lack of the capability to orientate the sweet spot to the target. It is important to emphasize that when the signal arrival direction is calculated from the directivity fields that are not equal to each other (which is the case in previously known systems) then the direction accuracy suffers from noise much more than when the system itself is re-orientated so that to make the directivity fields equal. This is a key aspect of the present disclosure providing the increased accuracy.

The disclosed new method, system and apparatus are based on recent implementations of ultra wideband impulse radio, integrated circuits (ICs) which are able to detect and measure the strength (energy, power or amplitude) of the first path signal pulse and differentiate it from shortly following reflections of the pulse. Additionally those integrated circuits (ICs) are able to measure the distance of the signal path based on time of flight (ToF) calculation.

This innovation adds the essential direction information to distance information, which as combined gives a strong basis for all tracking and indoor navigation applications.

Furthermore, the disclosed method has the advantage of being more accurate over a larger range of directional ranges over other methods involving sophisticated calculations.

The Direction Finding Method

Figure 17:
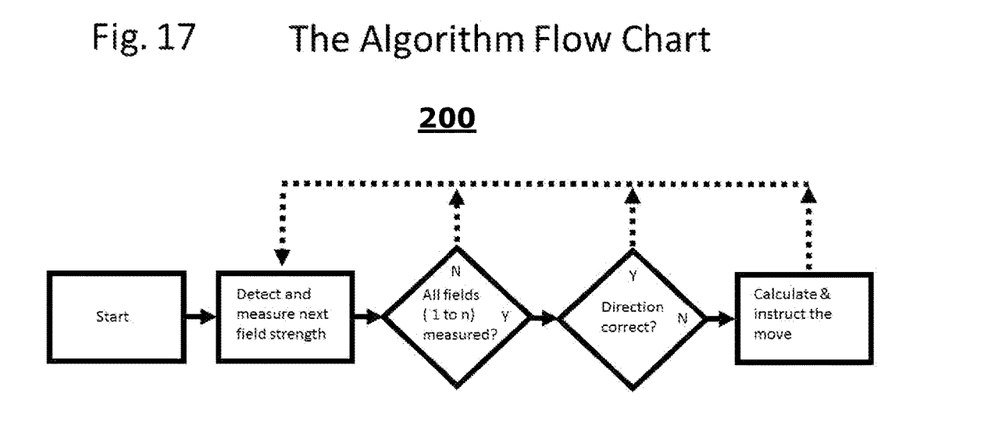
FIG. 17 illustrates steps of a method for determining a direction of a radio tag in relation to an apparatus, in accordance with an embodiment of the present disclosure.

This direction finding method is capable of finding the arrival direction of a tag signal from all solid angle directions. The direction of the arriving radio signal is determined in some repeated operational phases of measurements, direction calculations and corrective movements. Repeated iterations lead to a situation where the sweet spot is directed towards direction of the arrival signal. FIG. 17 illustrates the operational algorithm flow chart.

Referring to FIG. 17, illustrated are the steps of a method 200 for determining a direction of a radio tag in relation to an apparatus. The method 200 comprises steps of receiving a signal from the radio tag by the apparatus; determining an intensity of the received signal by at least two directivity fields formed by at least one antenna of the apparatus; determining a rough direction by a most intense directivity field; and turning the apparatus to a direction of the most intense directivity field until field intensities of the two directivity fields are equal.

In an embodiment, the means for determining the direction may further include means for comparing strength of the at least two directivity fields such that a corrective movement can be instructed to the apparatus, and by corrective iterations a sweet spot direction can be found in a crossing line of sweet spot planes of equality of opposite gradient fields with same polarization direction, of each comparable field pairs such that the sweet spot direction is along the crossing line of sweet spot planes.

Figure 3:
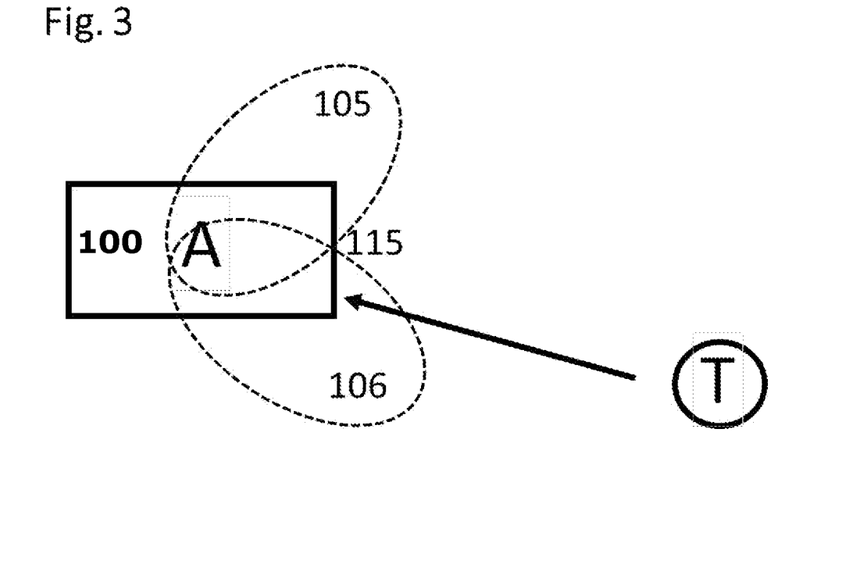
FIG. 3 illustrates an exemplary environment where a signal is stronger on a right side of an apparatus of the system of FIG. 1 for guiding the apparatus to turn right, in accordance with an embodiment of the present disclosure.
Figure 4:
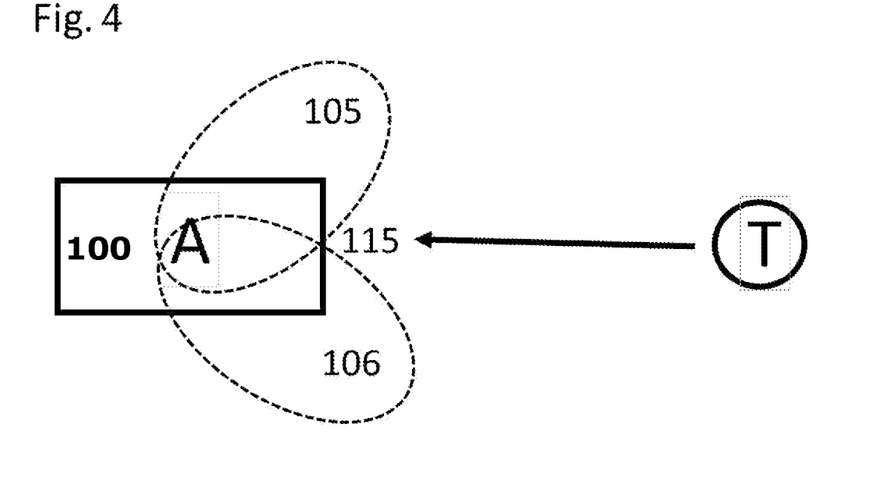
FIG. 4 is a schematic diagram depicting detection of a sweet spot where two fields are of equal value in a crossing line of two opposite gradients, in accordance with an embodiment of the present disclosure.

At the first phase of iteration all directivity field strengths are measured and compared. The strongest field indicates the rough direction. If we take the simplified example of FIG. 3, illustrated is an apparatus 100 with two directivity fields and would measure the right field 106 as the strongest. The next step would be to turn the apparatus 100 to the right by a defined small step to reach closer to the sweet spot direction 115. After some iterations, the sweet spot 115 would be directed towards the wanted direction of arrival signal, as illustrated in FIG. 4.

Figure 2:
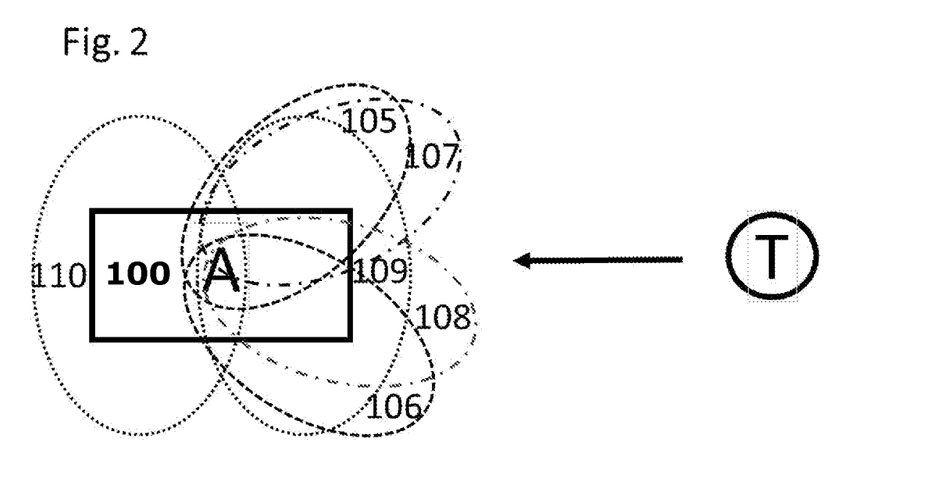
FIG. 2 is a schematic diagram of an apparatus, of the system of FIG. 1, with six different directivity field patterns that allows the detection of signal direction over whole solid angle, in accordance with an embodiment of the present disclosure.

In an embodiment, the apparatus 100 may utilize a practical set of six directivity fields for a purpose to cover the whole solid angle (as illustrated in FIG. 2). Six fields are divided to three symmetric pairs: back 110 and front 109 field pair to inform correct half solid angle direction; left 105 and right 106 pair to form vertical equality plane 113; and up 107 and down 108 pair to form horizontal equality plane 114.

Figure 8:
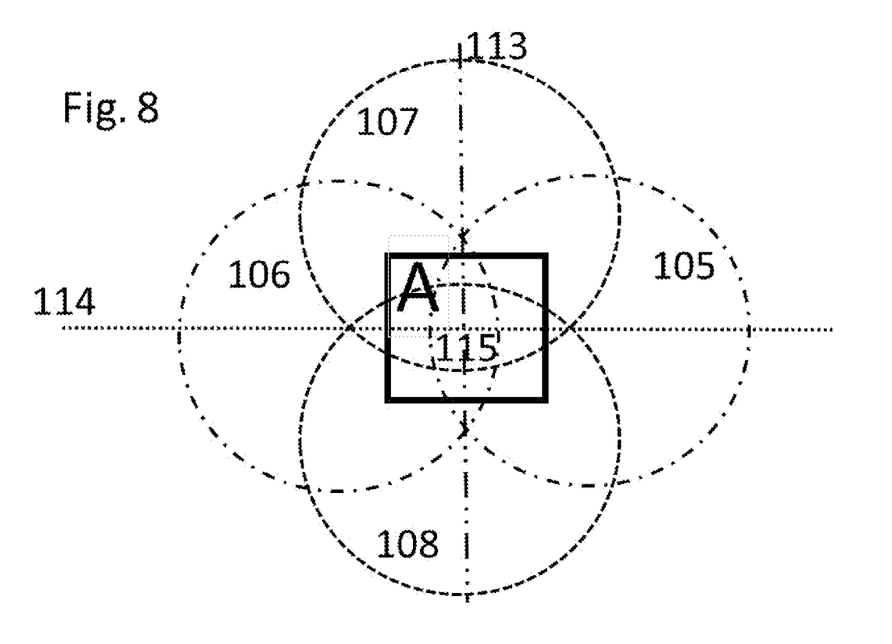
Figure 18:
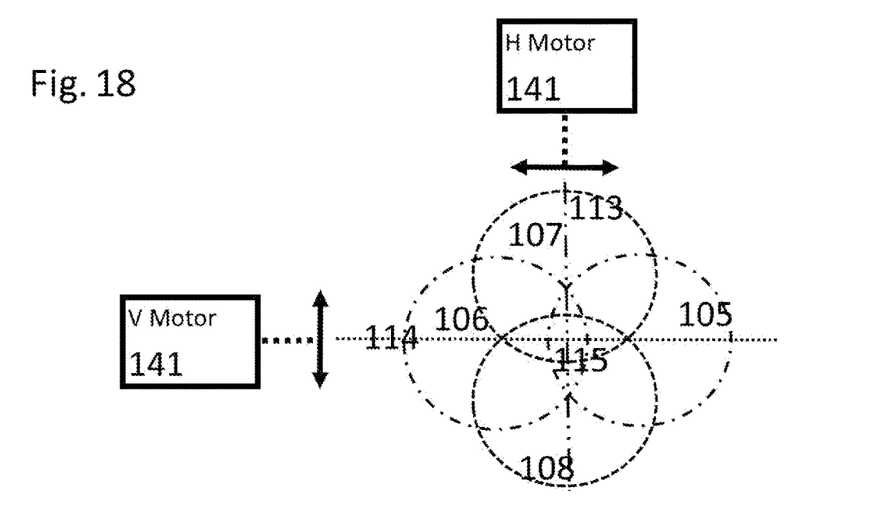
FIG. 18 is a schematic diagram depicting the horizontal and vertical movement of the apparatus with the help of motors, in accordance with an embodiment of the present disclosure.

In an embodiment, the method 200 may further include positioning of the at least one antennas for generating at least one sweet spot. The crossing line of horizontal 114 and vertical 113 planes forms the accurate sweet spot direction, as illustrated from front view in FIG. 8. In another embodiment, a turning motor (or user interface) 141 may comprise vertical and horizontal motors (as illustrated in FIG. 18) to reach the sweet spot 115.

In such an embodiment, after the correct half solid angle direction has been reached, the situation when the signal is coming from front, horizontal direction correction movements are done by comparing horizontal pair and instructing horizontal correction steps and the same for vertical steps based on comparison of vertical pair strengths.

Accuracy Based On Clean First Path Signal

Figure 1:
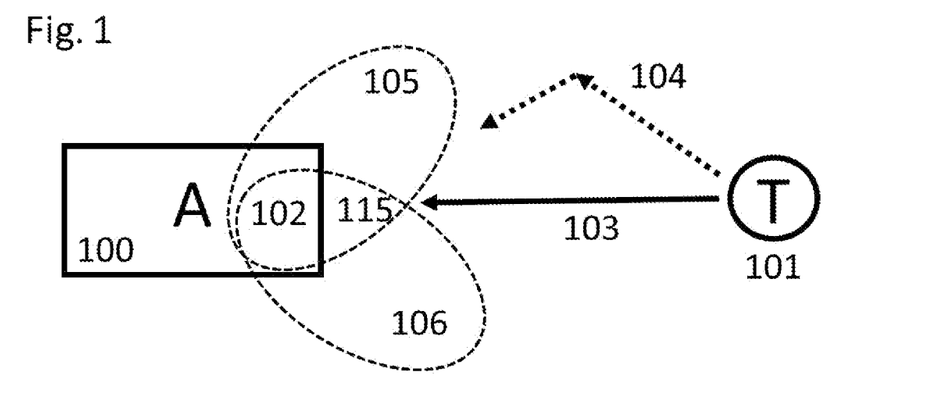
FIG. 1 is a schematic diagram of a system for finding a direction of arrival of a first path signal transmitted by a radio tag, in accordance with an embodiment of the present disclosure.

Referring to FIG. 1, the first factor of accuracy of this method is illustrated, which is based on a radio receiver system 102, which can detect and measure the strength of the first path signal 103 and differentiate it from the reflected signal 104. For example, the signal received by the apparatus 100 may be an ultra wideband (UWB) signal pulse. The function may be executed with ultra wideband (UWB) impulse radio receivers, which are able to detect the arrival time difference of the ultra wideband (UWB) signal pulse with accuracy even less than 100 picoseconds. The second factor is to determine an accurate sweet spot, where we have several methods.

Sweet Spot Methods

Figure 5:
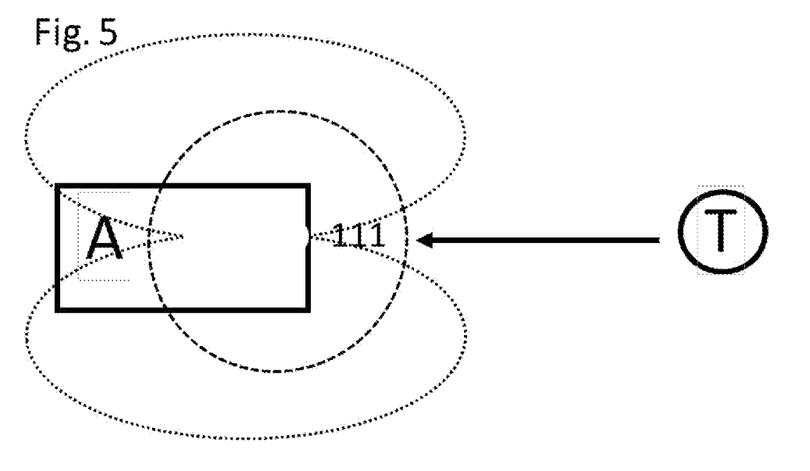
FIG. 5 is a schematic diagram depicting detection of a sweet spot where one field value reaches lower or even minimum ratio compared to a reference field, in accordance with another embodiment of the present disclosure.
Figure 6:
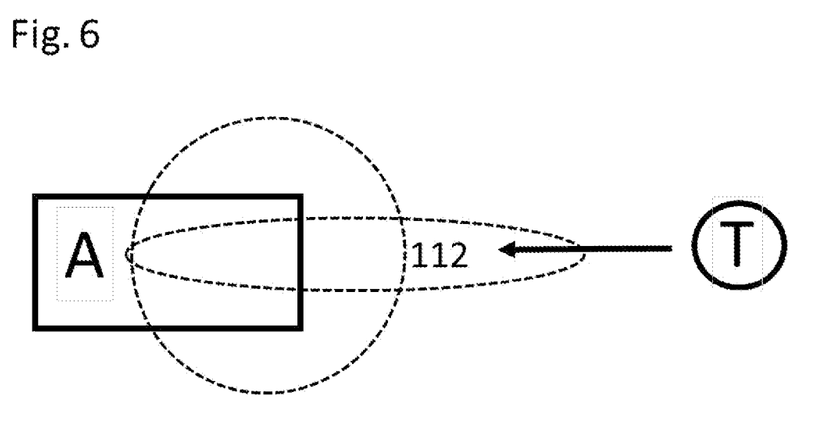
FIG. 6 is a schematic diagram depicting detection of a sweet spot where one field value reaches higher or even maximum ratio compared to reference field, in accordance with yet another embodiment of the present disclosure.

Referring to FIG. 4, the first method for determination of the sweet spot is illustrated. The method includes the equality of two symmetric fields in the crossing plane of opposite gradients. This method is found as most accurate in practical implementation. This description report is referring to this method if not otherwise mentioned. Two other potential methods are described in FIGS. 5 and 6. FIG. 5 illustrates an alternate method where one field 111 value reach the lower or even minimum ratio compared to a reference field and FIG. 6 illustrates another alternate method where the field 112 reach the higher or even maximum ratio compared to reference field. Methods referred to in FIG. 5 and FIG. 6 are simple implementations to cover even the whole solid angle with two fields, but lack of information of rough sweet spot direction. So those are useful only in applications where the random or deterministic scanning is possible.

Optionally, the method for finding a direction may be implemented wherein the at least two directivity fields of the at least one antenna are electrically adjustable. It may be appreciated that in such an embodiment, the at least two directivity fields may be adjusted in the direction of the most intense directivity field rather than turning the apparatus, or directing a user to turn in a particular direction.

Polarization

Figure 7:
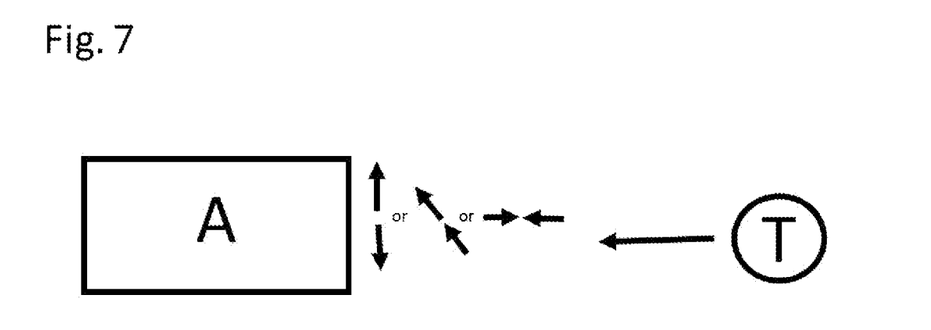
FIG. 7 is a schematic diagram depicting optimal same polarization directions of each compared field pairs, in accordance with an embodiment of the present disclosure.

When comparing each symmetric field pair it is essential concerning accuracy to position comparable field polarizations to the same direction, as illustrated in FIG. 7. Therefore, in an embodiment, a symmetric field pair setting with same polarity direction of the pair may produce accurate information for both horizontal and vertical movement of the apparatus.

System for Finding Direction

Referring to FIG. 1, embodiments of the present disclosure describe a system 10 for finding a direction. The system 10 comprises an apparatus 100, which further comprises a receiver, and at least one antenna capable to form at least two directivity fields 105, 106 (best shown in FIG. 1). Furthermore, the system 10 also comprises a radio tag 150, which further comprises a transmitter, and at least one antenna for sending signals to the apparatus (best shown in FIG. 10). The apparatus 100 includes means for determining the direction of the radio tag 101 by a first path signal received from the radio tag 101 by the at least two directivity fields 105, 106 of the at least one antenna of the apparatus 100. The direction is found by turning the apparatus 100 to a direction of the most intense directivity field of the first path signal until the field intensities of the two directivity fields 105, 106 are equal.

Apparatus for Finding Direction

Figure 9:
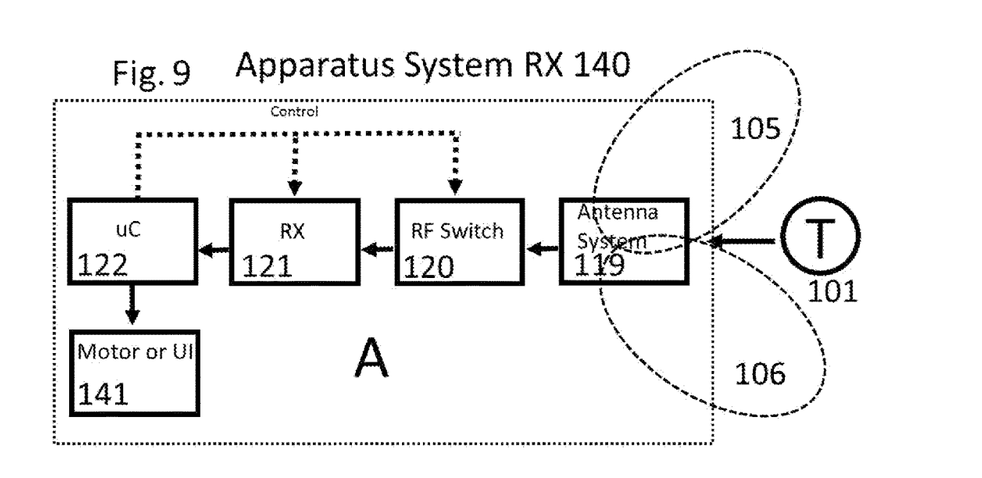
FIG. 9 is a schematic diagram of an apparatus, of the system of FIG. 1, with essential functional blocks and as a receive only mode, in accordance with an embodiment of the present disclosure.

Referring to FIG. 9, embodiments of the present disclosure describe the apparatus 140 (alternatively may be referred to as a first unit) for finding a direction of the radio tag 101 having a transmitter and at least one antenna for sending signals to the apparatus 100. The apparatus 100 includes a receiver 121, at least antenna 119 capable to form at least two directivity fields 105, 106, and means 120, 121, 141 for determining the direction of the apparatus 100 by a first path signal received from the radio tag 101 by the at least two directivity fields 105, 106 of the at least one antenna 119. The direction is found by turning the apparatus 100 to a direction of the most intense directivity field of the first path signal until the field intensities of the two directivity fields 105, 106 are equal.

The apparatus 140 as illustrated in FIG. 9 can be implemented as one integrated device or separate discrete functions.

In an embodiment, the apparatus 100 (shown in FIG. 1) may include at least two antennas capable to form at least two directivity fields. Antenna(s) create at least one defined power directivity field with known uniform directivity on wanted sector, steep enough gradient in the edge of the field, and low side and back lobes. In another embodiment, the antenna(s) may be capable to form at least four directivity fields with two equality planes. Optionally, the two equality planes may be orthogonal to each other.

In an embodiment, defined directions of two or more fields cover the whole wanted scanning sector and the coverage range distance. The positioning of fields is very essential to reach a good accuracy of a sweet spot. Different practical antenna types and directional combination sets are described in FIGS. 13-16.

In reference to FIGS. 13-16, in an embodiment, the at least one antenna may form at least two directivity fields such that a sweet spot is identified where field strengths of the at least two directivity fields are equal. Optionally, the polarization direction of the compared directivity field pair may be same.

Figure 11:
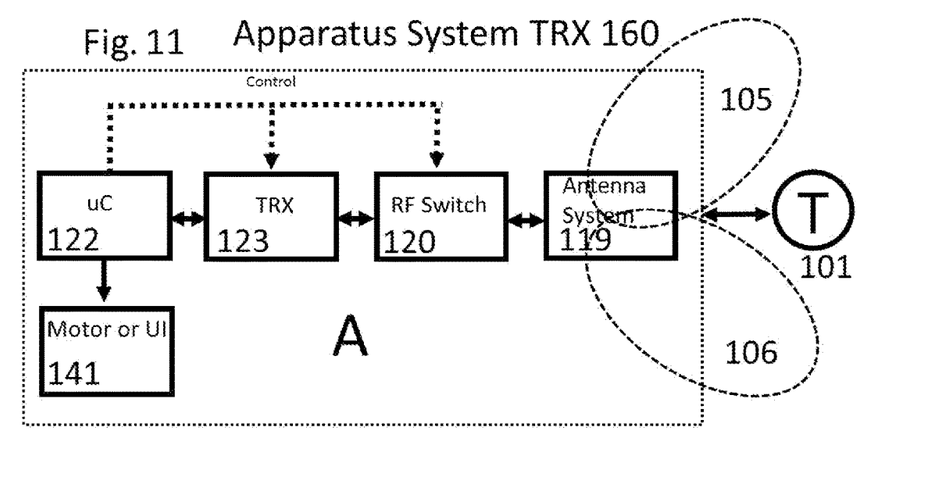
FIG. 11 is a schematic diagram of an apparatus, of the system of FIG. 1, with essential functional blocks and as a transceiver mode, in accordance with an embodiment of the present disclosure.

In an embodiment, the apparatus 160 may further include a transmitter or a transceiver 123 capable both to transmit and to receive signals, as shown in FIG. 11. Optionally, the apparatus 140 may include several receivers to measure all wanted field strengths at the same time, or include a fast enough switch function 120 between antenna system 119 and receiver 121 to measure wanted fields in series. The radio receiver 121 (shown in FIG. 9) may be used to detect first path signal, and measure the signal strength parameters.

In an embodiment, the apparatus 100 may include a microcontroller 122, algorithms, memory, logic and software to define timing of receiver measurements, collect the measurement information from receiver, control the switch of directivity fields, qualify measurement samples (as LoS, nLoS or invalid), filter the signal, calculate the signal strength, make estimation of direction of the signal and calculate and operate the movement needed to reach sweet spot direction, take care of the whole electronic system, start up, power management and status, function as a user interface to other electronic system or to a user person, in the case of a tag and an apparatus including a transceiver to send performance instructions for a tag.

Adaptive Power Control

Every radio receiver has a limited dynamic power range. To allow a wide functional application range (0-300 m), optionally, the apparatus 100 may further include means for adaptive power control between the apparatus and the radio tag. This disclosure describes three different methods to adjust the transmission power level of a tag to keep the received power level at a wanted dynamic range to adjust the power based on distance information between a tag and an apparatus; to adjust the transmission power level of a tag in relation to received power level and information about fixed or communicated transmission power level of an apparatus; and to adjust the transmission power level of a tag based on communicated instructions from the apparatus.

Figure 12:
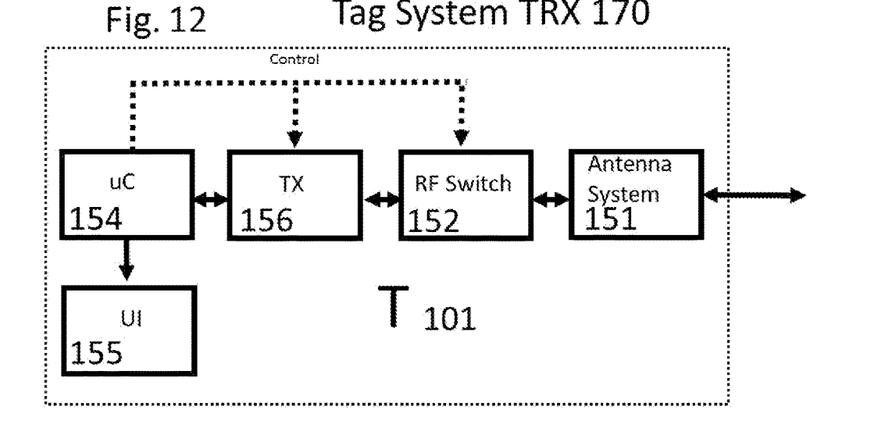
FIG. 12 is a schematic diagram of a radio tag, of the system of FIG. 1, with essential functional blocks and as a transceiver mode, in accordance with an embodiment of the present disclosure.

The optimal power control it is implemented easier when both apparatus and tag are equipped with transceivers, which allows directional information change for optimal performance. FIG. 11 and FIG. 12 illustrates functional block diagrams of an apparatus 160 and a radio tag 170 with transceivers.

Radio Tag

Figure 10:
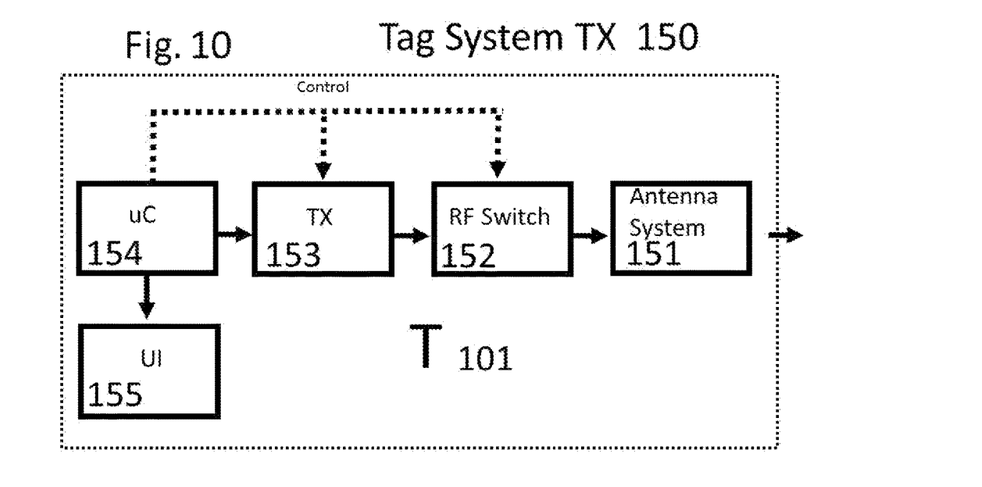
FIG. 10 is a schematic diagram of a radio tag, of the system of FIG. 1, with essential functional blocks and as a transmit only mode, in accordance with an embodiment of the present disclosure.

In embodiments of the disclosure, the system 10 for finding a direction further comprises the radio tag 101. FIG. 10 illustrates essential functional blocks of the radio tag 101 (alternatively may be referred to as a second unit), which can be implemented as one integrated device or separate discrete functions.

In an embodiment, the radio tag 101 comprises (an) antenna(s) 151 capable to send signal to all wanted directions.

In an embodiment, the radio tag 150 further comprises antenna Switch 152, a radio transmitter 153 and a microcontroller 154, algorithm and software to control the transmission. The radio tag 150 also includes a user Interface of Tag 155. Further, the radio tag 170 also includes a transceiver 156 (shown in FIG. 12).

The algorithm and software control the transmission which may be utilised to: send defined signal; if several antennas, to define and switch the transmission directivity field; define transmission power based on distance or other information from apparatus; manage power functions of a tag; if applicable, operate the user interface; and if applicable, change polarization angle of antenna system.

Antenna Systems Constructions

Figure 13:
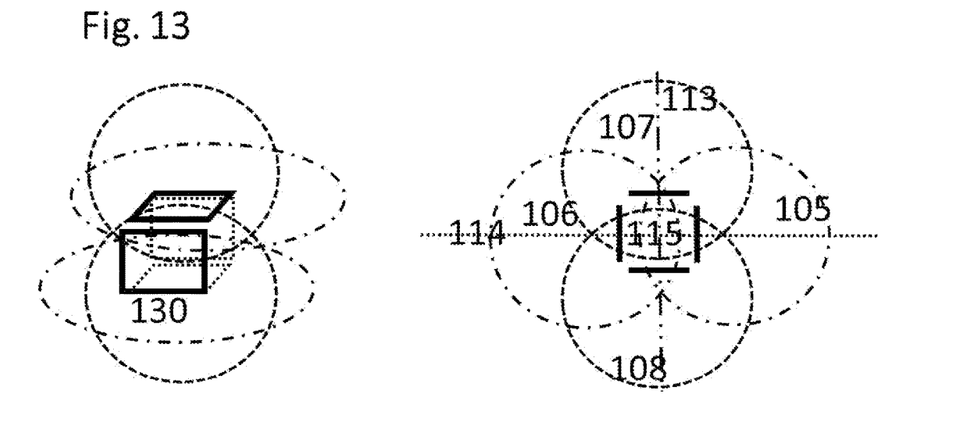
FIG. 13 is a schematic diagram depicting a set of four patch antennas, from side and front views, to form a sweet spot, in accordance with an embodiment of the present disclosure.
Figure 14:
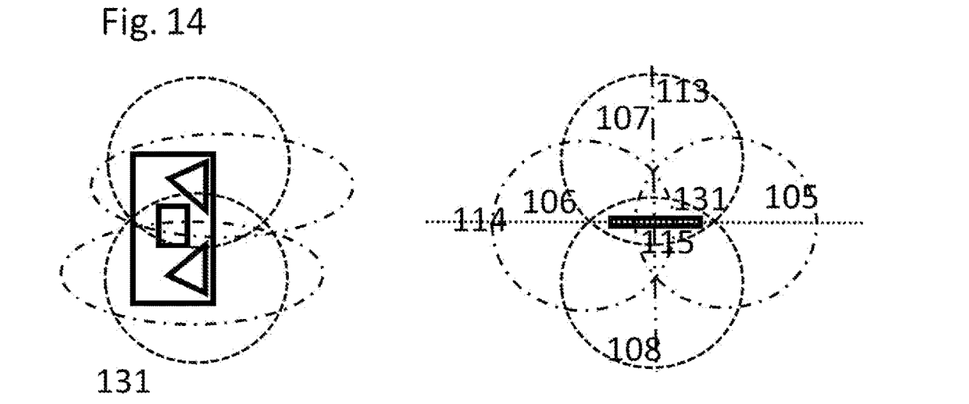
FIG. 14 is a schematic diagram depicting an antenna board, from up and front views, of two log periodic and two patch antennas on opposite sides of the board, to create an accurate sweet spot, in accordance with an embodiment of the present disclosure.
Figure 15:
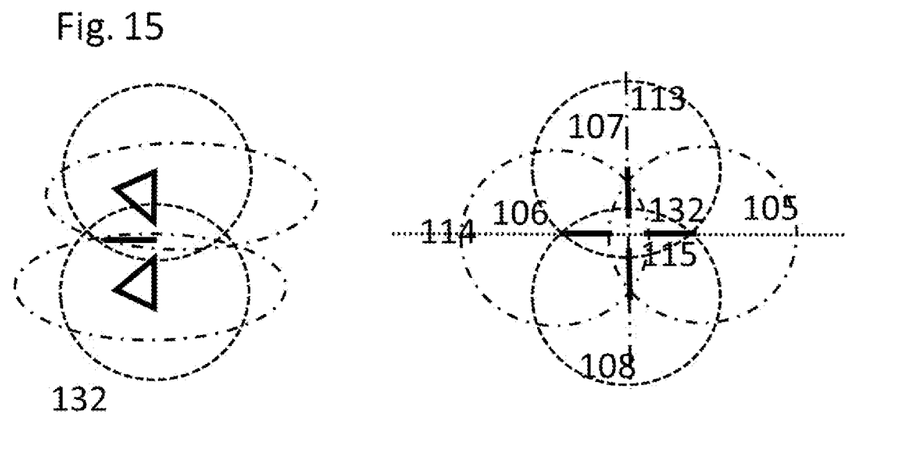
FIG. 15 is a schematic diagram depicting a set of four log periodic antennas, from side and front views, to form a sweet spot, in accordance with an embodiment of the present disclosure.
Figure 16:
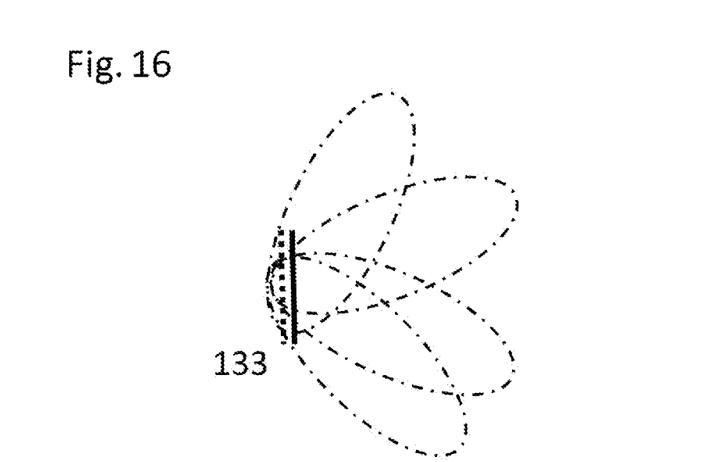
FIG. 16 is a schematic diagram depicting an electrically adjustable antenna to form defined directivity fields, in accordance with an embodiment of the present disclosure.

This description of several antenna systems to form directivity fields illustrated in FIGS. 1-8. In an embodiment, the at least one antenna may be a patch antenna. For a small volume implementation patch antenna setting 130 illustrated in FIG. 13 is optimal. Optionally, the at least one antenna may be formed in a pyramid or a cube. A set of four patch antennas can be positioned as a cube or pyramid shape based on requirements of specific application. FIG. 14 illustrates a wider but only a two dimensional solution 131 of two log periodic and two patch antennas on opposite sides of same board. This is a simple construction and a cost effective solution. FIG. 15 illustrates a set of four log periodic antennas 132, this needs more space but allows longer use range. FIG. 16 illustrates one antenna solution 133 (an electrically adjustable antenna), where defined directivity fields are adjusted electrically. This one antenna solution is the smallest and allows direction finding without turning the apparatus, but requires special design of antenna for every application purpose.

Software

Embodiments of the present disclosure also include a software product comprising a non-transitory computer-readable storage medium having computer-readable instructions stored thereon, the software product being executable by a computerized device comprising processing hardware to implement the method described hereinabove.

Application

This method enables a practical implementation of an apparatus, such as the apparatus 100, with performance. For example, the apparatus may includes following attributes signal direction finding with accuracy better than +−2 degrees; 1 k measurements/sec; measurement range 0-300 m (in line of sight, LoS situation); works also nLos through several materials like textiles and wood (not through water or metal); covers whole solid angle (360 degree); compliant with international radio band and power regulations; and in relation with one or more target tags up to 1000.

The apparatus can be implemented in different forms like an apparatus with electrically adjusted directivity fields, an apparatus capable to turn itself; and an apparatus which signals turning instructions to user.

INDUSTRIAL APPLICABILITY

This method and apparatus allows several practical implementations for different navigation applications by adding the direction information.

A robotic system equipped with this invention is able to move or operate to specific direction of a radio tag.

A person equipped with this apparatus is able to find a person or an object of interest equipped with a radio tag.

An auto follow camera equipped with this apparatus is able to find and direct the focus to a person or an object of interest equipped with a radio tag.

An augmented reality display device equipped with this apparatus is able to navigate direction of the wanted real object or give information related to the object or the situation.

The application example of auto follow camera is described here in more details. The popularity of selfie images have shown the need of people to express and communicate their life in many situations. It is evident conclusion that many people want to express their life also with video clips or live video streams during their normal live action. The second evident conclusion is that an auto follow camera can add freedom and quality to the expression. The same conclusion relates also to professional video productions when there are many potential objects to follow accurately. The application installation in an auto follow camera case includes minimum one camera equipped with a direction finding mechanism, turning motors and a radio tag for the object to follow. When both the direction finding mechanism and the tag are powered on the mechanism starts to instruct motors to direct camera to the direction of a radio tag. This direction finding solution of detecting the first path signal is optimal in line of sight situations, like video production is, as it is based on a clean reflection free information. This invention describes also the practical need to extend detection depth range by adaptive power control methods, which adjusts the transmit power of a tag to the suitable dynamic reception level of an apparatus. This kind of implementation can be done with satellite based positioning, but the accuracy or speed of detection are weak and doesn't work indoors. Image processing is a good method for video applications, but lack of capability to differentiate objects with same colour or adapt to changing light conditions.

What is claimed is:

1. An apparatus for finding a direction of a radio tag having a transmitter and at least one antenna for sending signals to the apparatus, the apparatus comprising:
    a receiver;
    at least one antenna capable to form at least two directivity fields; and
    means for determining the direction of the apparatus by a first path signal received from the radio tag by the at least two directivity fields of the at least one antenna of the apparatus;
    wherein the direction is found by turning the apparatus to a direction of the most intense directivity field of the first path signal until the field intensities of the two directivity fields are equal.

2. The apparatus in accordance with claim 1, wherein the means for determining the direction further includes means for comparing strength of the at least two directivity fields such that a corrective movement can be instructed to the apparatus, and by corrective iterations a sweet spot direction can be found in a crossing line of sweet spot planes of equality of opposite gradient fields with same polarization direction, of each comparable field pairs such that the sweet spot direction is along the crossing line of sweet spot planes.

3. The apparatus in accordance with claim 1 further includes a transmitter or a transceiver capable both to transmit and to receive signals.

4. The apparatus in accordance with claim 1 includes at least two antennas capable to form at least two directivity fields.

5. The apparatus in accordance with claim 1, wherein the at least one antenna forms at least two directivity fields such that a sweet spot is identified where field strengths of the at least two directivity fields are equal.

6. The apparatus in accordance with claim 1, wherein the at least one antenna is capable to forms at least four directivity fields with two equality planes.

7. The apparatus in accordance with claim 6, wherein the two planes are orthogonal to each other.

8. The apparatus in accordance with claim 2, wherein polarization direction of the compared directivity field pair is the same.

9. The apparatus in accordance with claim 1, wherein the at least one antenna is a patch antenna.

10. The apparatus in accordance with claim 9, wherein the at least one antenna are formed in a pyramid or a cube.

11. The apparatus in accordance with claim 1, further includes means for adaptive power control between the apparatus and the radio tag.

12. A system for finding a direction, the system comprising:
    an apparatus comprising
        a receiver, and
        at least one antenna capable to form at least two directivity fields,
    a radio tag comprising
        a transmitter, and
        at least one antenna for sending signals to the apparatus,
    wherein the apparatus includes means for determining the direction of the radio tag by a first path signal received from the radio tag by the at least two directivity fields of the at least one antenna of the apparatus, and wherein the direction is found by turning the apparatus to a direction of the most intense directivity field of the first path signal until the field intensities of the two directivity fields are equal.

13. A method for determining a direction of a radio tag in relation to an apparatus, the method comprising:
   receiving a signal from the radio tag by the apparatus;
   determining an intensity of the received signal by at least two directivity fields formed by at least one antenna of the apparatus;
   determining a rough direction by a most intense directivity field; and
   turning the apparatus to a direction of the most intense directivity field until field intensities of the two directivity fields are equal.

14. The method in accordance with claim 13, wherein the signal received by the apparatus is a ultra wideband signal pulse.

15. The method in accordance with claim 13, wherein the at least two directivity fields of the at least one antenna are electrically adjustable.

16. The method in accordance with claim 13 further includes positioning of the at least one antennas for generating at least one sweet spot.

17. The method in accordance with claim 13, wherein a symmetric field pair setting with same polarity direction of the pair produces accurate information for both horizontal and vertical movement of the apparatus.

18. A software product comprising a non-transitory computer-readable storage medium having computer-readable instructions stored thereon, the software product being executable by a computerized device comprising processing hardware to implement the method of claim 13.

* * * * *